S. H. BUNNELL.
PROCESS OF DESICCATING.
APPLICATION FILED JUNE 9, 191
1,149,627.
Patented Aug. 10, 1915.
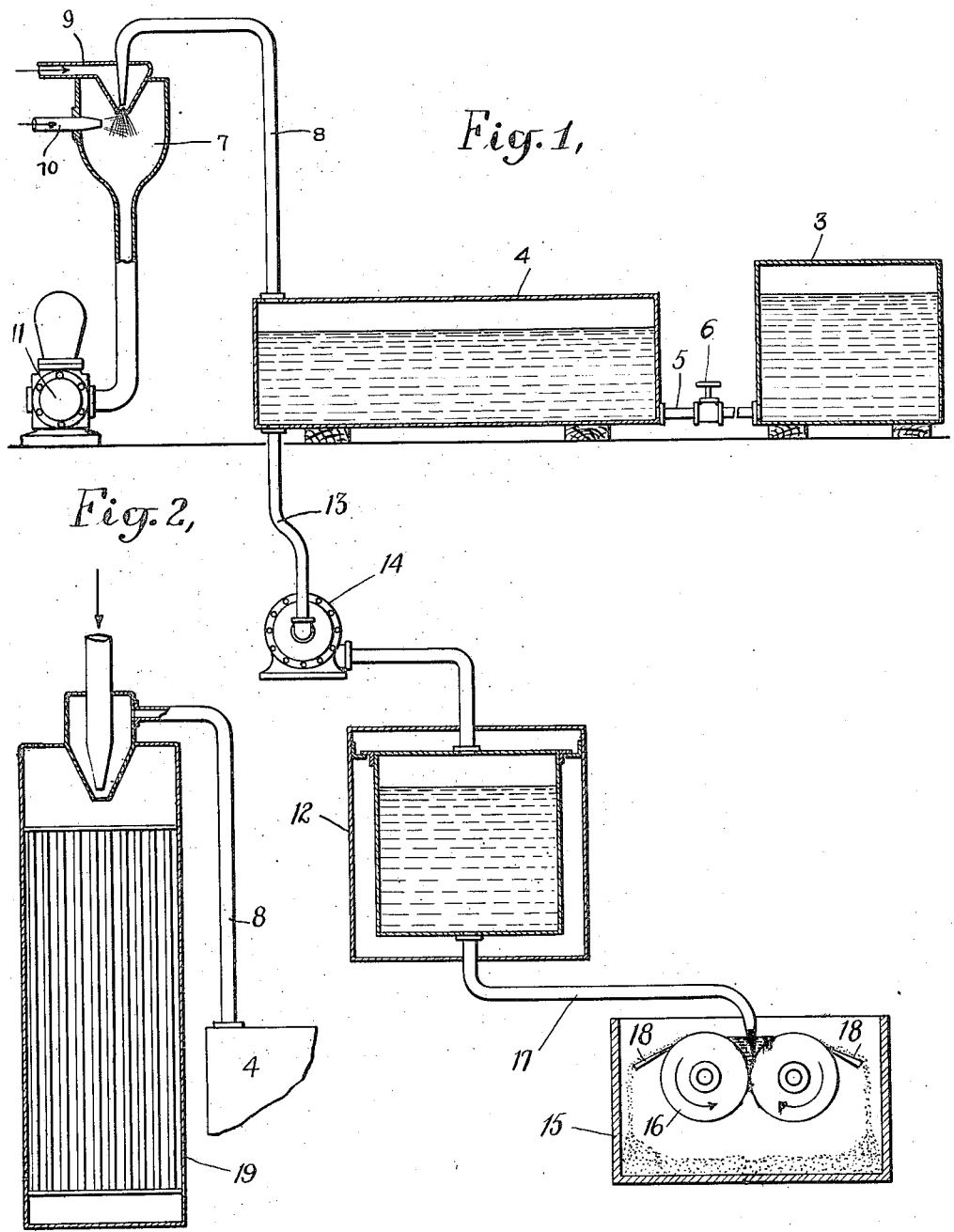

UNITED STATES PATENT OFFICE.

STERLING H. BUNNELL, OF NEW CANAAN, CONNECTICUT, ASSIGNOR TO THE GRISCOM-RUSSELL COMPANY, A CORPORATION OF DELAWARE.

PROCESS OF DESICCATING.

1,149,627.      Specification of Letters Patent.      Patented Aug. 10, 1915.

Application filed June 9, 1914. Serial No. 843,928.

*To all whom it may concern:*

Be it known that I, STERLING H. BUNNELL, a citizen of the United States, residing in New Canaan, county of Fairfield, and State of Connecticut, have invented certain new and useful Improvements in Processes of Desiccating; and I do hereby declare the following to be a full, clear, and exact description of the invention, such as will enable others skilled in the art to which it appertains to make and use the same.

This invention relates to processes of desiccating adapted particularly for use in the desiccation of milk. The invention is directed to the provision of an improved process of desiccating which is more economical than those heretofore employed.

The object of the invention is to provide an economical process of desiccating in accordance with which the apparatus employed may be operated continuously or for periods of substantial length in desiccating milk or other fluid substance without danger of loss due to spoiling of the milk even though the milk is received at the desiccating station in quantities of substantial size with relatively long time intervals between.

In farming districts, milk is collected by farmers and is delivered by them at desiccating plants in substantial quantities. With apparatus of the character heretofore used, it has been common practice to make the desiccating apparatus of such large size as to be capable of desiccating all of a large quantity of milk so delivered in such a short period of time as would preclude the possibility of spoiling of the milk. As a consequence, the apparatus has been made of a capacity much larger than would be necessary to produce the desired quantity of desiccated material per day if the apparatus were operated substantially continuously and this expensive apparatus is idle for periods of time of considerable length.

Instead of making the apparatus of a size disproportionately large relatively to the quantity of material to be desiccated per day, suitable refrigerating or pasteurizing apparatus may be provided for the reception and treatment of the milk immediately after the latter is received from the farmer so that the danger of spoiling of the milk will be eliminated. After the milk has passed through this apparatus, it may be introduced into the desiccating apparatus at a rate depending upon the capacity of the desiccating apparatus and the latter may be operated continuously. Thus the provision of the refrigerating or pasteurizing apparatus permits of substantial reduction in the size of the desiccating apparatus so that the cost of the latter is greatly reduced. The total cost of the apparatus, however, is substantially unchanged by reason of the addition of the refrigerating or pasteurizing apparatus.

The present invention is directed to the provision of a process which is far more economical than either of those above referred to. My improved process involves cooling the milk immediately after it is received at the desiccating station as has been proposed heretofore, but in accordance with the invention, this cooling is accompanied by concentration of the material. In fact, the cooling is effected directly by the concentration of the material. When the milk is received at the desiccating station, it is immediately introduced into apparatus for simultaneously cooling and concentrating it. Thereafter, it is stored in a receptacle where it is retained at the low temperature to which it has been reduced and it is drawn from this receptacle at such slow rate as is desired for introduction into the apparatus for completing the desiccation of the material. In the practice of the process, I prefer to employ a condenser connected to a refrigerating and desiccating receptacle into which the milk is first introduced. The vapor rising from the milk in this receptacle is drawn off by the condenser, thus simultaneously reducing the temperature of the milk and withdrawing moisture from it. This operation is continued until the temperature of the milk has been reduced to such a point as will permit of keeping the milk the required length of time without danger of spoiling. During this operation, a substantial quantity of moisture will be withdrawn from the milk. Thereafter, the concentrated milk is introduced into any suitable form of desiccating apparatus whereby more complete withdrawal of the moisture in the milk is effected, producing a dry milk powder.

By this process, the desiccating apparatus which produces the powdered product may be operated continuously although supplies of liquid milk are received at the desiccating station only once in twenty-four hours and danger of spoiling of the milk is eliminated by reason of the fact that the liquid milk is refrigerated immediately after its reception at the station. The desiccating apparatus, therefore, need be of no larger capacity than is required for desiccating by continuous operation the quantity of milk received daily at the station. The use of such desiccating apparatus of smaller size is made possible by the provision of the refrigerating apparatus employed for preventing spoiling of the milk between the time of its reception at the station and the time of its introduction into the apparatus which produces the milk powder. But the expense of providing and using this refrigerating apparatus is more than offset by the fact that the operation of the refrigerating apparatus is accompanied by concentration of the material.

I have illustrated diagrammatically in the accompanying drawings, apparatus which may be employed in practising the process of my invention. I wish it understood, however, that the invention is not dependent upon the use of apparatus of any particular form but that, on the contrary, it may be practised with forms of apparatus varying widely in their construction.

In the accompanying drawings, Figure 1 is a diagrammatic representation of the apparatus and Fig. 2 is a diagrammatic view of a different form of condenser which may be employed instead of that shown in Fig. 1.

Referring to these drawings, 3 indicates a receiving chamber of any suitable capacity into which the liquid milk is admitted at the time of its reception at the desiccating station. This chamber is connected to a combined cooling and concentrating chamber 4. For this purpose, a pipe is shown at 5 having a valve 6 therein. The chamber 3 is of such size that it will hold at least as much liquid milk as is ever received at the station at one time. The valve 6 is preferably of such form that it may be set in a position for allowing the milk to flow from the chamber 3 into the receptacle 4 at the rate at which the milk will be properly refrigerated in the receptacle 4. Suitable means may be provided for guarding against too rapid flow of the milk into the receptacle 4.

The refrigerating and desiccating receptacle 4 is connected to any suitable means for drawing off the vapor rising in the receptacle so as to reduce the temperature of the milk in the chamber and at the same time withdraw moisture therefrom. In Fig. 1, an ejector jet condenser is shown at 7 for this purpose, this being connected by a pipe 8 to the top of the receptacle 4. The condenser 7 is supplied with steam through a pipe 9 and with condensing water through a pipe 10. Steam flowing through pipe 9 enters the condenser through a nozzle opening thereby inducing a current through the concentric nozzle opening of pipe 8 and causing the flow of vapor from the receptacle 4. The mixed current of steam and vapor is then condensed by the jet of water below. A pump 11 is provided for drawing off from the condenser 7 the cooling water and the condensation of the steam and vapor.

The action of the apparatus so far described results in reducing the temperature of the liquid milk admitted to the chamber 4 to such a degree that spoiling of the milk thereafter and before it is admitted to the final desiccating apparatus is prevented. This cooling of the milk is effected by withdrawal of vapor rising from the milk so that it is accompanied by concentration of the milk. In other words, the operation resorted to for the protection of the milk against spoiling during the period intervening between its reception at the station and its introduction into the apparatus for producing the milk powder is an operation which partially accomplishes the desiccation of the material. Thereafter, the material is conveyed from the receptacle 4 to the apparatus which completes the desiccation.

After the liquid milk has been cooled and concentrated in the receptacle 4, it is conveyed to a storage receptacle 12 specially constructed so as to prevent absorption of heat by the milk. A conduit is shown at 13 for carrying the milk to the receptacle 12 and a pump 14 is connected in the pipe 13 for effecting the flow of the milk. From the receptacle 12, the cooled and concentrated milk is carried to the apparatus for producing the milk powder. I have shown such an apparatus diagrammatically at 15 in Fig. 1. This apparatus may be of any of the forms heretofore used or of any form found to be desirable. For the purpose of illustration, I have shown a desiccating apparatus of the type employing heated rolls on the surface of which the material to be desiccated is received. These rolls are shown at 16 arranged parallel to each other and in contact. The milk is carried from the receptacle 12 by a pipe 17 and deposited upon the upper surfaces of the rolls 16. These rolls rotate in the directions indicated by the arrows and the dried milk adhering to their surfaces is removed by the blades 18.

In Fig. 1, a jet condenser is shown connected to a steam ejector for drawing off vapor from the receptacle 4 in order to cool and concentrate the milk. It will be understood that a surface condenser may be employed for this purpose instead of a jet condenser. Such a surface condenser is shown at 19 in Fig. 2, this being provided with the same form of steam ejector for facilitating the flow of vapor from the receptacle 4.

The apparatus for producing the milk powder employed in practising my improved process is preferably of such size as to be capable of desiccating the desired quantity of milk per day by operating continuously or by operating continuously for a given number of hours. But it is furnished with milk to be desiccated from a supply all of which may be received at one time. Operation in this manner without danger of loss of material is made possible by the use of the cooling apparatus for cooling the milk immediately after its reception at the station and the added cost of this cooling apparatus is offset by the fact that the cooling is accompanied by a concentration of the material.

I claim:

1. The process of desiccating which consists in simultaneously cooling and concentrating the material and thereafter desiccating the concentrated material; substantially as described.

2. The process of desiccating consisting in cooling the material to be desiccated by withdrawing moisture therefrom and thereafter completing the withdrawal of moisture from the material; substantially as described.

3. The process of desiccating which consists in cooling the material to be desiccated by drawing off from the material vapor given off by it and thereafter desiccating the material so cooled to produce a powdered product; substantially as described.

4. The process of desiccating which consists in admitting the material to be desiccated to a confined space so as to partially fill the same, drawing off from said space the vapor of the material therein so as to cool and concentrate the material, then carrying the concentrated material to a desiccating apparatus and desiccating the concentrated material to produce a powdered product; substantially as described.

In testimony whereof I affix my signature, in presence of two witnesses.

STERLING H. BUNNELL.

Witnesses:
DEAN S. EDMONDS,
VIOLET C. BENNETT.